United States Patent
Yamamoto et al.

(10) Patent No.: US 7,613,596 B2
(45) Date of Patent: Nov. 3, 2009

(54) TIRE PROFILE DESIGNING METHOD

(75) Inventors: Takuya Yamamoto, Kobe (JP); Masatoshi Tanaka, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 236 days.

(21) Appl. No.: 11/230,565

(22) Filed: Sep. 21, 2005

(65) Prior Publication Data

US 2006/0116855 A1   Jun. 1, 2006

(30) Foreign Application Priority Data

Dec. 1, 2004   (JP) ............... 2004-348045

(51) Int. Cl.
*G06F 7/60* (2006.01)
*B60C 11/13* (2006.01)

(52) U.S. Cl. ............... 703/2; 703/8; 152/209.14; 152/209.24

(58) Field of Classification Search ............... 703/2, 703/8; 152/209, 454, 30, 151, 209.01, 209.14, 152/209.15, 209.24, 383, 392, 404, 405
See application file for complete search history.

(56) References Cited

U.S. PATENT DOCUMENTS

| | | | | |
|---|---|---|---|---|
| 4,708,185 A * | 11/1987 | Imai et al. | ............... | 152/451 |
| 4,955,416 A * | 9/1990 | Takeuchi et al. | ............... | 152/454 |
| 4,970,300 A * | 11/1990 | Fulton et al. | ............... | 530/383 |
| 5,803,999 A * | 9/1998 | Shibata | ............... | 152/209.14 |
| 6,073,668 A * | 6/2000 | Iwasaki et al. | ............... | 152/209.14 |
| 6,430,993 B1 * | 8/2002 | Seta | ............... | 73/146 |
| 7,133,736 B2 * | 11/2006 | Caretta et al. | ............... | 700/117 |

FOREIGN PATENT DOCUMENTS

JP   2002-301916 A   10/2002

OTHER PUBLICATIONS

Chu et al., Computer Aided Parametric Design for 3D Tire Mold Production, 2005.*

* cited by examiner

*Primary Examiner*—Paul L Rodriguez
*Assistant Examiner*—Andre Pierre Louis
(74) *Attorney, Agent, or Firm*—Birch, Stewart, Kolasch & Birch, LLP (57) ABSTRACT

A tire profile (12) includes a tread (16), a shoulder (18), a flat portion (20), an upper sidewall (22) and a lower sidewall (24). The shoulder (18) is provided in contact with a tread (16) at a point (Pa). The flat portion (20) is provided in contact with the shoulder (18) at a point (Pb). The upper sidewall (22) is provided in contact with the flat portion (20) at a point (Pc). A system including an input portion and a calculating portion is used for designing the profile (12). When the numeric values of a radius of curvature (R1) of the shoulder (18) and an inclination angle (θ) of the flat portion (20) are input by the input portion, the calculating portion calculates a length (L) of the flat portion (20) and a radius of curvature (R2) of the upper sidewall (22). Based on the input numeric values and the calculated numeric values, the profile (12) is drawn by CAD software.

8 Claims, 11 Drawing Sheets

Create new profile

Standard information

| Tyre size | | | Rim width | | | Overall diameter | | | Section width | | |
|---|---|---|---|---|---|---|---|---|---|---|---|
| mm | % | inch | Rth | Rm | Rmin | Rmax | Do | Dmax | Dmin | S | Smax | Smin |
| | | | mm | inch | inch | inch | mm | mm | mm | mm | mm | mm |
| 205 | 65 | 15 | 143.5 | 6 | 5.5 | 7.5 | 647 | 655 | 639 | 209 | 217 | 201 |

| Tyre size (mm) | Tyre size (%) | Tyre size (inch) | Rth (mm) | Rm (inch) | Rmin (inch) | Rmax (inch) | Do (mm) | Dmax (mm) | Dmin (mm) | S (mm) | Smax (mm) | Smin (mm) |
|---|---|---|---|---|---|---|---|---|---|---|---|---|
| 205 | 65 | 15 | 143.5 | 6 | 5.5 | 7.5 | 647 | 655 | 639 | 209 | 217 | 201 |

Basic dimensions

| D1 | W1 | W2 | D2 | H1 |
|---|---|---|---|---|
| mm | mm | mm | mm | mm |
| 645 | 178 | 217.8 | 378.9 | 67.8 |

Tread dimensions

| W3 | Param 1 | Param 2 |
|---|---|---|
| mm | | |
| 170 | 7.97 | 1.78 |

Sidewall dimensions

| R1 | θ | L | L/UH | R2 | DeR | Dent |
|---|---|---|---|---|---|---|
| mm | deg | mm | % | mm | mm | mm |
| 35.4 | 33 | | 0 | 69.13 | | |

Buttress option

Back

Fig. 6

Buttress option

- Option 1   Input R1 & $\theta$ → Output L & R2
- Option 2   Input R1 & R2 → Output $\theta$ & L
- Option 3   Input R1 & L → Output $\theta$ & R2
- Option 4   Input L & R2 → Output R1 & $\theta$ Back

Fig. 7

Buttress option

Option 1 : Input R1 & θ → Output L & R2

| D2 | D1 | W1 | H1 | W3 | R1 |
|---|---|---|---|---|---|
| mm | mm | mm | mm | mm | mm |
| 378.9 | 645 | 214.6 | 67.8 | 167 | 35.4 |
| 378.9 | 645 | 214.6 | 67.8 | 167 | |

| URO θ | θ | L | R2 | DeR | Dent |
|---|---|---|---|---|---|
| deg | deg | mm | mm | mm | mm |
| 45.027 | 33 | | 69.13 | | |
| 45.027 | | | | | |

Save option

Fig. 8

Buttress option

Option 2 : Input R1 & R2 → Output θ & L

| D2 | D1 | W1 | H1 | W3 | R1 |
|---|---|---|---|---|---|
| mm | mm | mm | mm | mm | mm |
| 378.9 | 645 | 214.6 | 67.8 | 167 | 35.4 |
| 378.9 | 645 | 214.6 | 67.8 | 167 | |

| URO θ | θ | L | R2 | DeR | Dent |
|---|---|---|---|---|---|
| deg | deg | mm | mm | mm | mm |
| 45.027 | 33 | | 69.13 | | |
| 45.027 | | | | | |

Save option

Fig. 9

Buttress option

Option 3 : Input R1 & L → Output θ & R2

| D2 | D1 | W1 | H1 | W3 | R1 |
|---|---|---|---|---|---|
| mm | mm | mm | mm | mm | mm |
| 378.9 | 645 | 214.6 | 67.8 | 167 | 35.4 |
| 378.9 | 645 | 214.6 | 67.8 | 167 | |

| URO θ | θ | L | R2 | DeR | Dent |
|---|---|---|---|---|---|
| deg | deg | mm | mm | mm | mm |
| 45.027 | 33 | | 69.13 | | |
| 45.027 | | | | | |

Save option

Fig. 10

Buttress option

Option 4 : Input L & R2 → Output R1 & θ

| D2 | D1 | W1 | H1 | W3 | R1 |
|---|---|---|---|---|---|
| mm | mm | mm | mm | mm | mm |
| 378.9 | 645 | 214.6 | 67.8 | 167 | 35.4 |
| 378.9 | 645 | 214.6 | 67.8 | 167 | |

| URO θ | θ | L | R2 | DeR | Dent |
|---|---|---|---|---|---|
| deg | deg | mm | mm | mm | mm |
| 45.027 | 33 | | 69.13 | | |
| 45.027 | | | | | |

Save option

Fig. 11

TIRE PROFILE DESIGNING METHOD

This application claims priority on Japanese Patent Application No. 2004-348045 filed on Dec. 1, 2004, the entire contents of which are hereby incorporated by reference.

BACKGROUND OF THE INVENTION

1. Field of the Invention

The present invention relates to a method of designing a tire profile. More particularly, the present invention relates to a method of designing a profile in the vicinity of a buttress of a tire.

2. Description of the Related Art

A tire comprises a tread, a shoulder linked to the tread, a adjustment portion linked to the shoulder, and a sidewall linked to the adjustment portion. The sectional shape of the shoulder is arcuate and has an upper end provided in contact with the end of the tread. The adjustment portion is usually flat. In other words, the sectional shape of a general adjustment portion is straight. The adjustment portion has an upper end provided in contact with the lower end of the shoulder. The sectional shape of the upper part of the sidewall is arcuate and has an upper end provided in contact with the lower end of the adjustment portion. The shoulder and the adjustment portion are also referred to as a buttress. There is also a tire in which a adjustment portion is not flat. A tire having no adjustment portion is also present.

The profile of a tire influences the basic performance of the tire, for example, a handling stability or a ride comfort. It is necessary to determine a proper profile corresponding to the concept of the tire. Japanese Laid-Open Patent Publication No. 2002-301916 has disclosed a method of determining a tread profile using an involute function.

In respect of the basic performance of the tire, a profile in the vicinity of the buttress is also important. A designer specifies the numeric values of a radius of curvature of the shoulder, an inclination angle of the adjustment portion, a length of the adjustment portion and a radius of curvature of an upper sidewall in order to reflect his (her) own designing thought. In order to achieve these numeric values, CAD software or FEM software is used to determine a profile. For the determination, trial and error are repeated. A long time is required for designing the profile. As a result of the trial and error, it is found that the specified numeric values cannot be achieved in an actual tire in some cases. In these cases, the numeric values are specified again, and furthermore, the trial and error is repeated.

It is an object of the present invention to provide a designing method capable of easily obtaining a profile in the vicinity of a buttress.

SUMMARY OF THE INVENTION

A method of designing a tire profile according to the present invention comprises the steps of:

inputting numeric values of a radius of curvature of a shoulder and an inclination angle of a adjustment portion; and calculating numeric values of a length of the adjustment portion and a radius of curvature of an upper sidewall based on the input numeric values.

By the designing method, it is possible to obtain a tire profile including a tread, a shoulder and a sidewall. It is preferable that the designing method should further comprise the step of drawing a tire profile by CAD software or FEM software based on the input numeric values and the calculated numeric values.

Another method of designing a tire profile according to the present invention comprises the steps of:

inputting numeric values of a radius of curvature of a shoulder and a radius of curvature of an upper sidewall; and calculating numeric values of an inclination angle of a adjustment portion and a length of the adjustment portion based on the input numeric values.

By the designing method, it is possible to obtain a tire profile including a tread, a shoulder and a sidewall. It is preferable that the designing method should further comprise the step of drawing a tire profile by CAD software or FEM software based on the input numeric values and the calculated numeric values.

A further method of designing a tire profile according to the present invention comprises the steps of:

inputting numeric values of a radius of curvature of a shoulder and a length of a adjustment portion; and calculating numeric values of an inclination angle of the adjustment portion and a radius of curvature of an upper sidewall based on the input numeric values.

By the designing method, it is possible to obtain a tire profile including a tread, a shoulder and a sidewall. It is preferable that the designing method should further comprise the step of drawing a tire profile by CAD software or FEM software based on the input numeric values and the calculated numeric values.

A further method of designing a tire profile according to the present invention comprises the steps of:

inputting numeric values of a length of a adjustment portion and a radius of curvature of an upper sidewall; and calculating numeric values of a radius of curvature of a shoulder and an inclination angle of the adjustment portion based on the input numeric values.

By the designing method, it is possible to obtain a tire profile including a tread, a shoulder and a sidewall. It is preferable that the designing method should further comprise the step of drawing a tire profile by CAD software or FEM software based on the input numeric values and the calculated numeric values.

According to the present invention, it is possible to easily obtain a profile in the vicinity of a buttress. In the present invention, it is possible to enhance the efficiency of the design of the profile.

DESCRIPTION OF THE PREFERRED EMBODIMENTS

The present invention will be described below in detail based on preferred embodiments with reference to the drawings.

Figure 1:
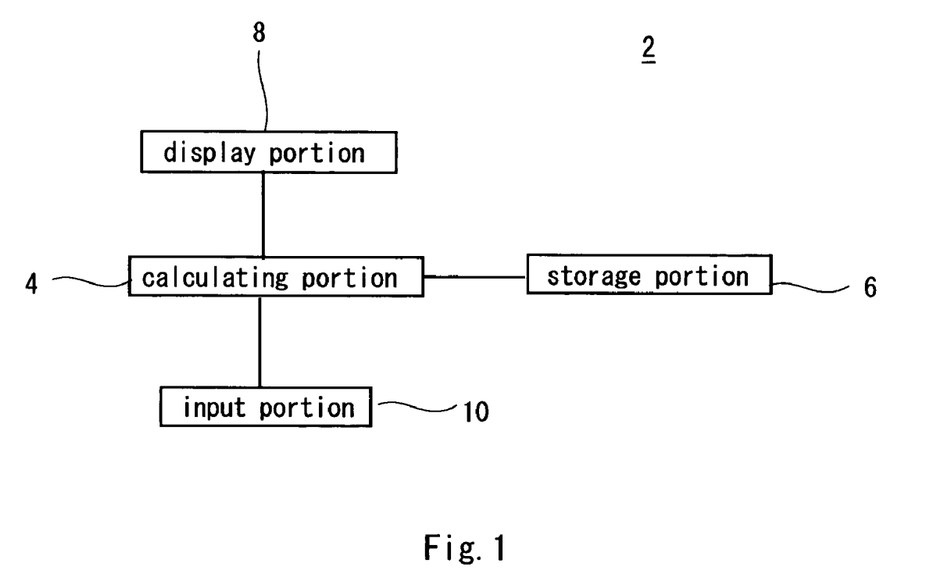
FIG. 1 is a conceptual diagram showing a system to be used in a designing method according to an embodiment of the present invention.

As a system 2 shown in FIG. 1, typically, a personal computer is used. The system 2 comprises a calculating portion 4, a storage portion 6, a display portion 8 and an input portion 10. The calculating portion 4 includes a CPU. The typical storage portion 6 is a hard disk. The typical display portion 8 is a monitor. The typical input portion 10 is a keyboard and a mouse. In the system 2, each step is executed by a computer program stored in the storage portion 6.

Figure 2:
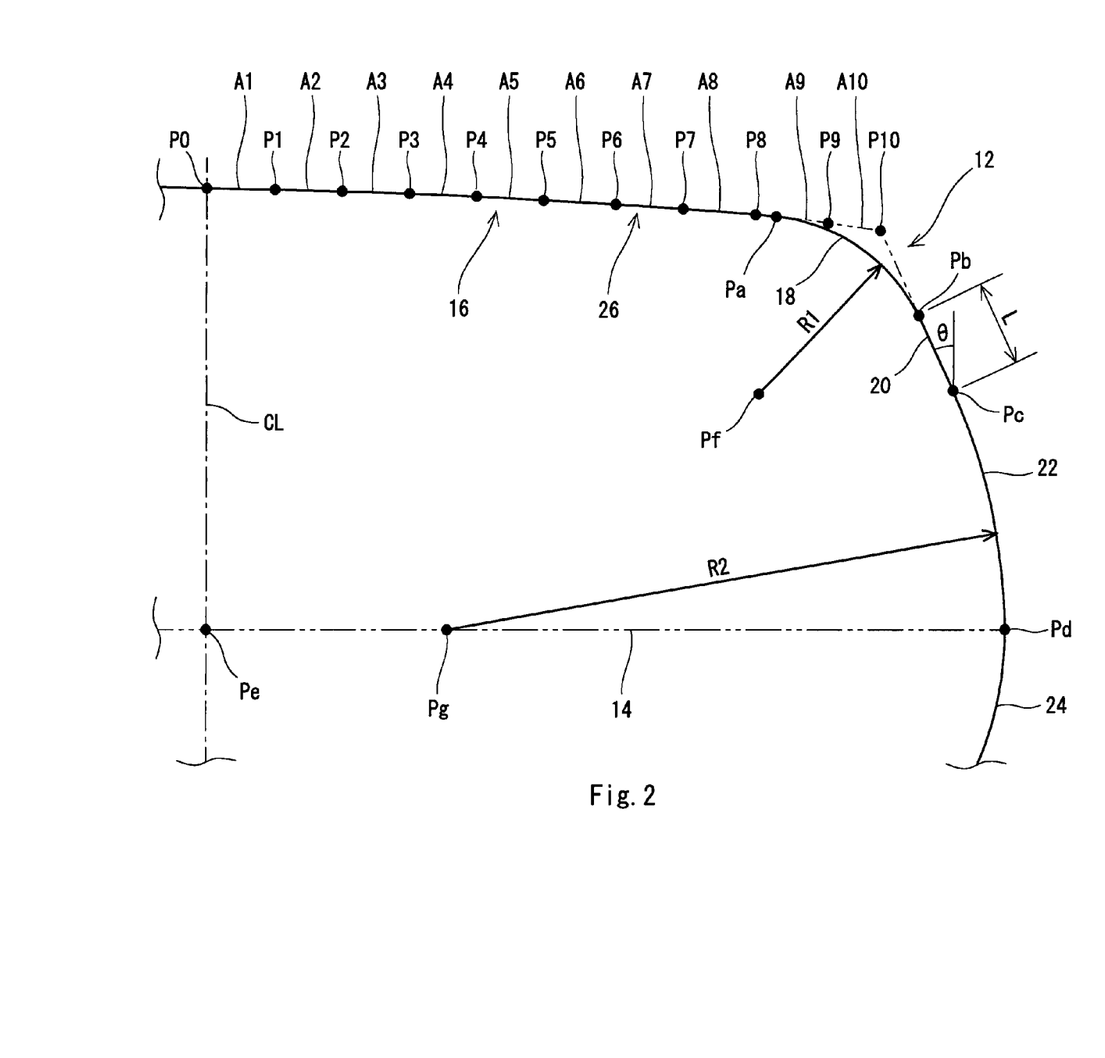
FIG. 2 is a typical view showing a tire profile designed by the system in FIG. 1.

FIG. 2 is a typical view showing a tire profile 12 designed by the system 2 in FIG. 1. A one-dotted chain line CL in FIG. 2 represents an equator plane of a tire. The profile 12 is symmetrical with respect to the one-dotted chain line CL. In FIG. 2, a straight line 14 passing through points Pe and Pd is a maximum width line. A distance between the points Pe and Pd is a half of the maximum width of the tire. The profile 12 includes a tread 16, a shoulder 18, a flat portion 20 to be a adjustment portion, an upper sidewall 22 and a lower sidewall 24.

In FIG. 2, a curve from a point P0 to a point P10 indicates a virtual tread 26. The virtual tread 26 is constituted by a first circular arc A1, a second circular arc A2, a third circular arc A3, a fourth circular arc A4, a fifth circular arc A5, a sixth circular arc A6, a seventh circular arc A7, an eighth circular arc A8, a ninth circular arc A9 and a tenth circular arc A10. The first circular arc A1 and the second circular arc A2 are provided in contact with each other at the point P1, the second circular arc A2 and the third circular arc A3 are provided in contact with each other at the point P2, the third circular arc A3 and the fourth circular arc A4 are provided in contact with each other at the point P3, the fourth circular arc A4 and the fifth circular arc A5 are provided in contact with each other at the point P4, the fifth circular arc A5 and the sixth circular arc A6 are provided in contact with each other at the point P5, the sixth circular arc A6 and the seventh circular arc A7 are provided in contact with each other at the point P6, the seventh circular arc A7 and the eighth circular arc A8 are provided in contact with each other at the point P7, the eighth circular arc A8 and the ninth circular arc A9 are provided in contact with each other at the point P8, and the ninth circular arc A9 and the tenth circular arc A10 are provided in contact with each other at the point P9.

In FIG. 2, a curve from the point P0 to a point Pa indicates the tread 16. The point Pa is positioned on a line of the ninth circular arc A9. In other words, the tread 16 is a part of the virtual tread 26. A portion from the point Pa to the point P10 in the virtual tread 26 is not included in the tread 16. The tread 16 includes the first circular arc A1, the second circular arc A2, the third circular arc A3, the fourth circular arc A4, the fifth circular arc A5, the sixth circular arc A6, the seventh circular arc A7 and the eighth circular arc A8. The tread 16 further includes a part of the ninth circular arc A9. More specifically, the tread 16 includes a portion from the point P8 to the point Pa in the ninth circular arc A9. The point Pa is an end of the tread 16. The tread 16 is referred to as a "multiradius tread".

In FIG. 2, the circular arc from the point Pa to a point Pb indicates the shoulder 18. In FIG. 2, an arrow R1 indicates a radius of curvature of the shoulder 18. The center of the radius of curvature R1 is represented as a point Pf. The shoulder 18 is provided in contact with the tread 16 at the point Pa. The point Pa also serves as an upper end of the shoulder 18. The point Pb is a lower end of the shoulder 18.

In FIG. 2, a straight line from the point Pb to a point Pc indicates the flat portion 20. The extended line of the flat portion 20 passes through the end point P10 of the virtual tread 26. In FIG. 2, an arrow L indicates the length of the flat portion 20. In FIG. 2, θ denotes the inclination angle of the flat portion 20. The inclination angle θ is usually set on the basis of a vertical direction. The inclination angle θ may be set on the basis of other directions. The flat portion 20 is provided in contact with the shoulder 18 at the point Pb. The point Pb also serves as an upper end of the flat portion 20. The point Pc serves as a lower end of the flat portion 20.

In FIG. 2, the circular arc from the point Pc to the point Pd indicates the upper sidewall 22. In FIG. 2, an arrow R2 indicates a radius of curvature of the upper sidewall 22. A center Pg of the radius of curvature R2 is positioned on the maximum width line 14. The upper sidewall 22 is provided in contact with the flat portion 20 at the point Pc. The point Pc also serves as an upper end of the upper sidewall 22. The point Pd serves as a lower end of the upper sidewall 22. The upper sidewall 22 is provided in contact with the lower sidewall 24 at the point Pd.

Figure 3:
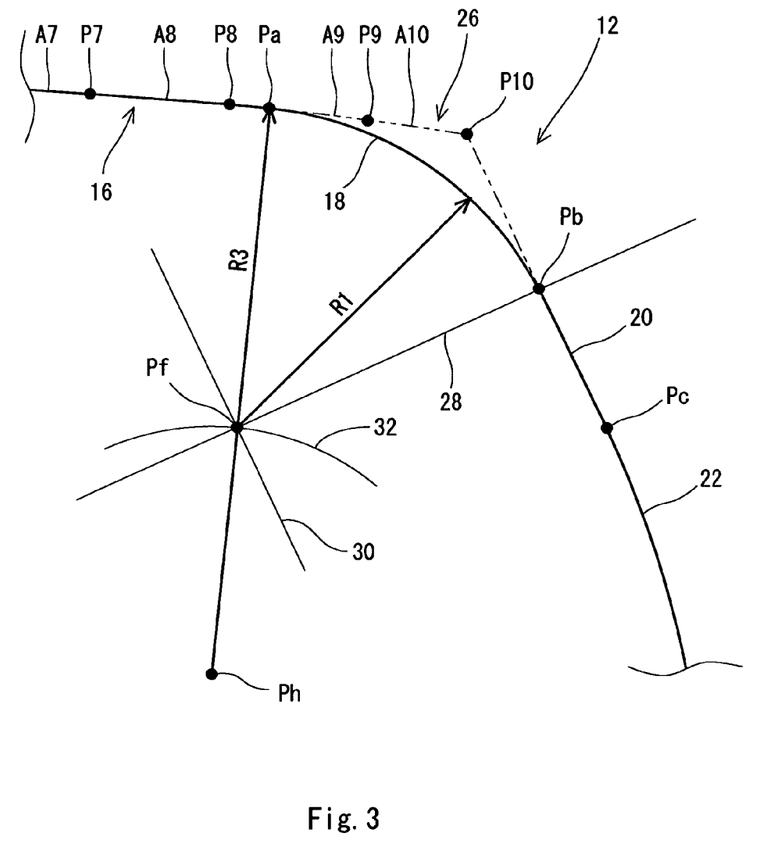
FIG. 3 is an enlarged view showing a part of the profile in FIG. 2.

FIG. 3 is an enlarged view showing a part of the profile 12 in FIG. 2. As described above, the shoulder 18 is provided in contact with the flat portion 20 at the point Pb. Accordingly, the center Pf of the shoulder 18 is positioned on a straight line 28 which passes through the point Pb and is perpendicular to the flat portion 20. In FIG. 3, 30 denotes a straight line which is parallel with the flat portion 20 and has the distance R1 from the flat portion 20. With a variation in the length L of the flat portion 20, the coordinates of the point Pb are changed and the coordinates of the point Pf are also changed. The coordinates of the point Pf are changed along the straight line 30.

In FIG. 3, an arrow R3 denotes a radius of curvature of the circular arc A9, and Ph denotes a center of a radius of curvature R3. In FIG. 3, 32 denotes a circular arc having a center Ph and a radius of (R3-R1). As described above, the shoulder 18 is provided in contact with the circular arc A9 at the point Pa. The coordinates of the point Pa are changed along the circular arc A9. With the change, the coordinates of the point Pf are also changed. The coordinates of the point Pf are changed along the circular arc 32.

Thus, the coordinates of the point Pf are changed along the straight line 28 and the circular arc 32. In other words, the point Pf is an intersection of the straight line 28 and the circular arc 32.

Figure 4:
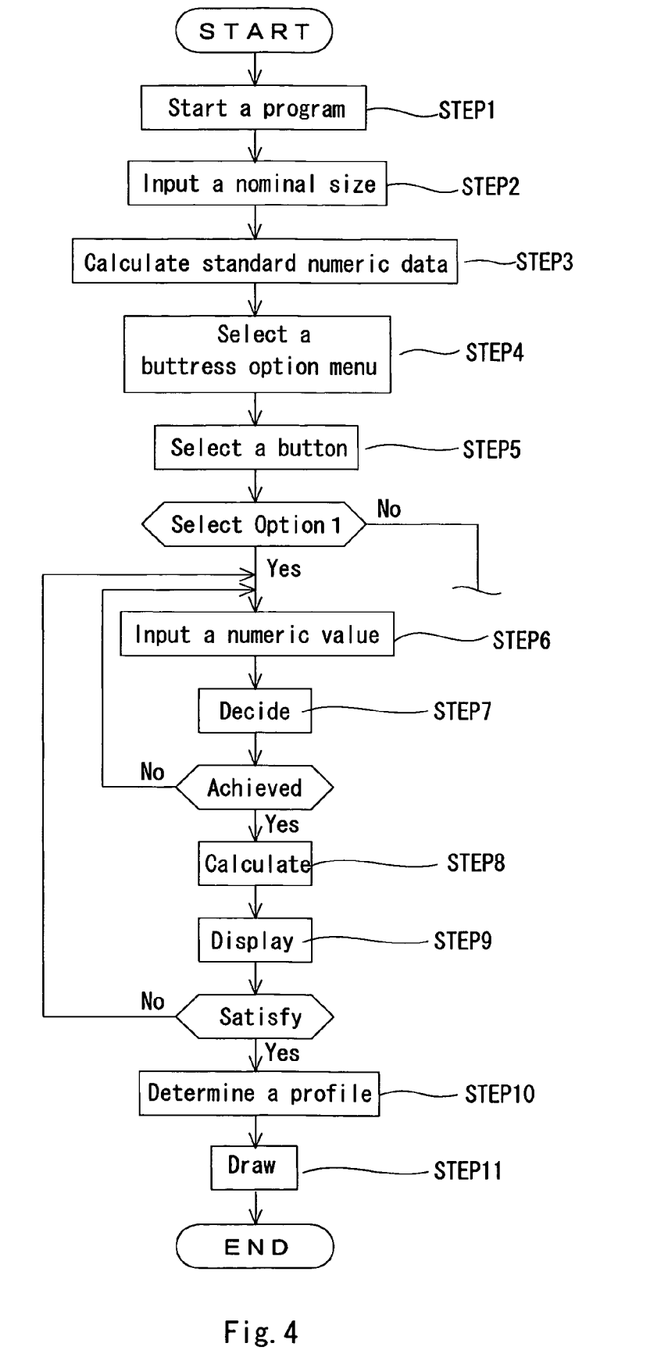
FIG. 4 is a flowchart showing an example of a designing method for the profile in FIGS. 2 and 3.
Figure 5:
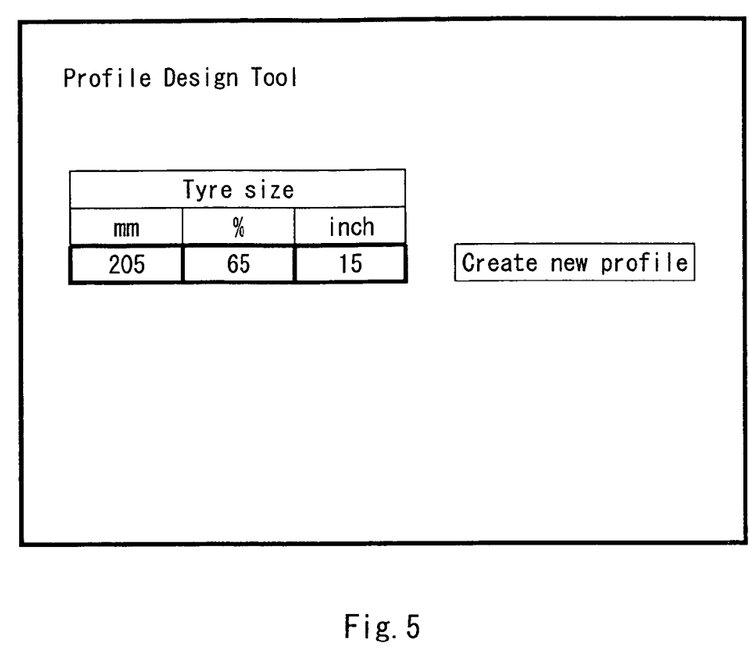
FIG. 5 is a front view showing a picture displayed on the system in FIG. 1.

FIG. 4 is a flowchart showing an example of a designing method for the profile 12 in FIGS. 2 and 3. In the designing method, the shape of the virtual tread 26 is previously given. The shape of the virtual tread 26 can be determined by the method disclosed in the Japanese Laid-Open Patent Publication No. 2002-301916, for example. The shape of the virtual tread 26 may be determined by another method. In the designing method, a computer program is first started (STEP 1). By the starting, an initial picture shown in FIG. 5 is displayed on the display portion 8.

The initial picture includes a table of "Tyre size". In the table, a cell surrounded by a heavy line is an input enable cell. An operator inputs a nominal size of the tire to the table (STEP 2). The input portion 10 is used for the input. In an example of FIG. 5, 205 is input as a nominal width (mm), 65 is input as a nominal aspect ratio (%), and 15 is input as a nominal rim diameter (inch). After the input, the operator clicks a button of "Create new profile". By the click, standard numeric data for a standard profile are calculated (STEP 3).

Figure 6:
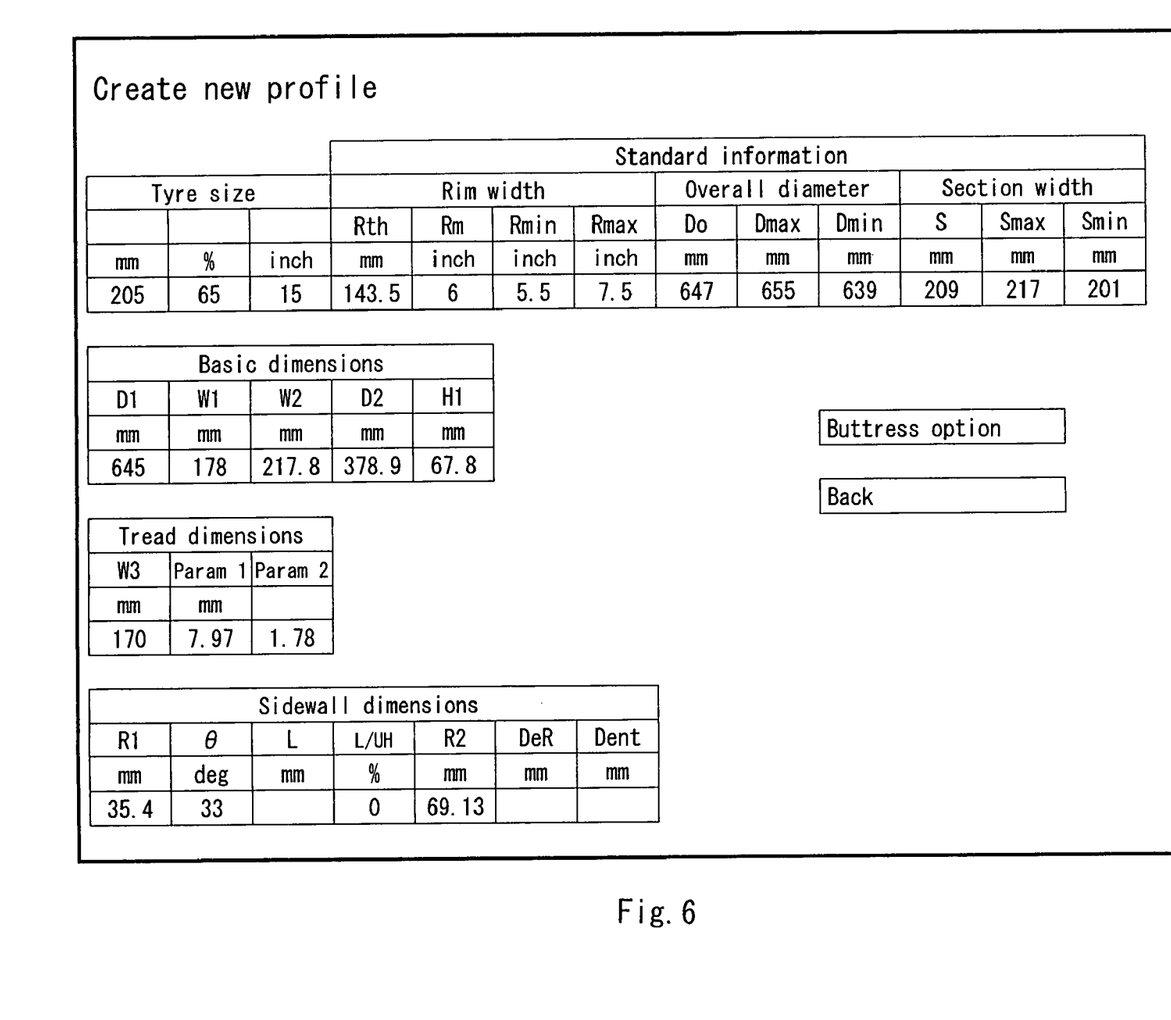
FIG. 6 is a front view showing a picture displayed on the system in FIG. 1.

By the calculation of the standard numeric data, a picture shown in FIG. 6 is displayed on the display portion 8. The picture includes tables for Standard information, Basic dimensions, Tread dimensions and Sidewall dimensions. Standard numeric data are described in each of the tables. The standard numeric data are calculated based on the nominal size. The calculation is carried out by the calculating portion 4. In order to take standards and technical know-how into consideration in the calculation, a program is created. In order to have a geometrical relationship shown in FIG. 3 in the calculation, the program is created. Simultaneously with the calculation (STEP 3), the coordinates of the end Pa of the tread 16 are determined. The picture shown in FIG. 6 includes a button of "Buttress option". The operator clicks the button. By the click, a buttress option menu is selected (STEP 4).

Figure 7:
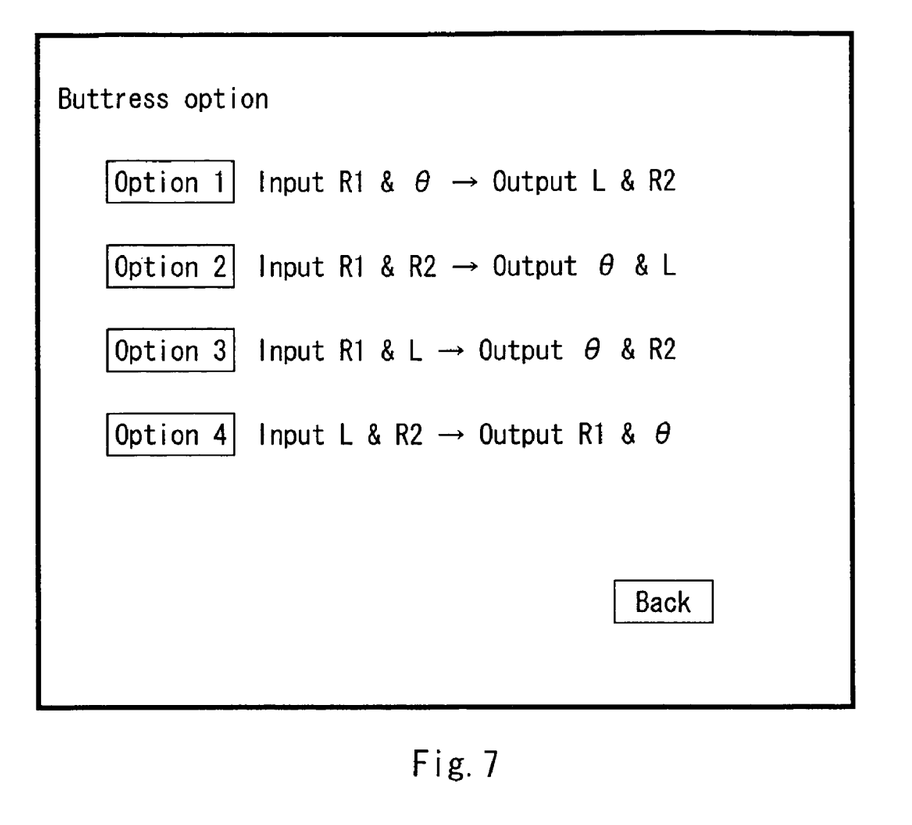
FIG. 7 is a front view showing a picture displayed on the system in FIG. 1.

By the selection of the buttress option menu, a picture shown in FIG. 7 is displayed on the display portion 8. The picture includes buttons of "Option 1", "Option 2", "Option 3" and "Option 4". The operator selects any of the buttons (STEP 5). The flow will be described below by taking, as an example, the case in which the button of "Option 1" is selected.

Figure 8:
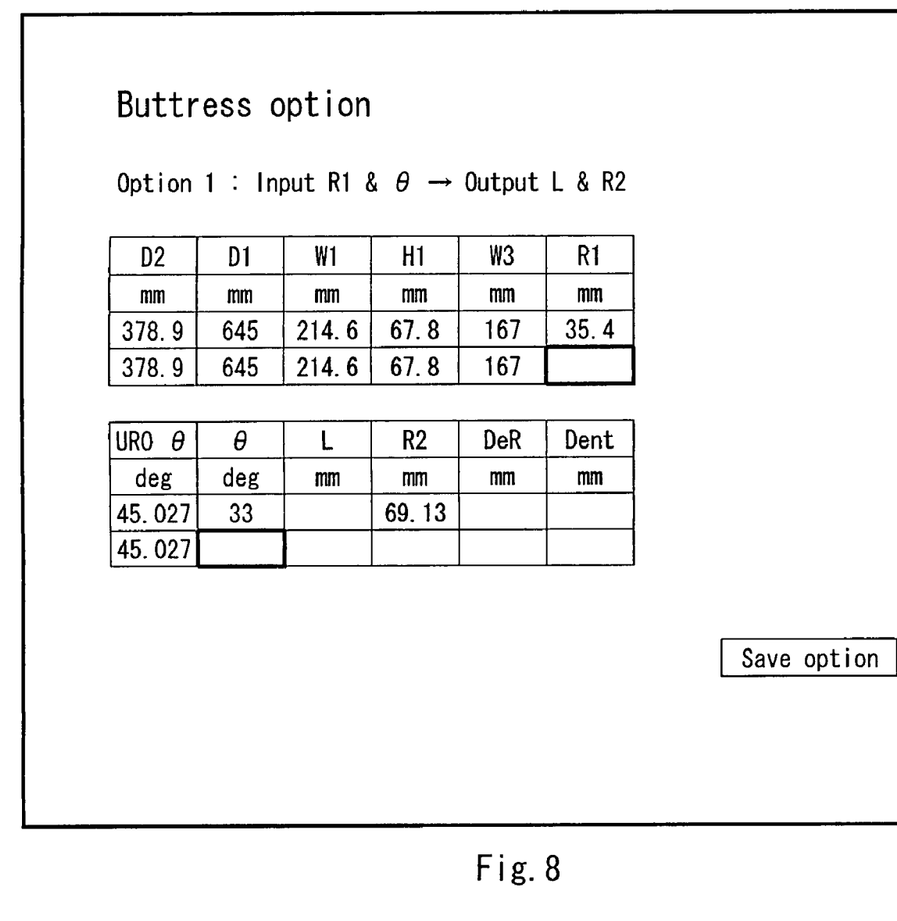
FIG. 8 is a front view showing a picture displayed on the system in FIG. 1.

By selecting the button of "Option 1", a picture shown in FIG. 8 is displayed on the display portion 8. A table on the picture includes two rows in which the numeric values of dimensions are described. Standard numeric data extracted from the table shown in FIG. 6 are described on an upper row. A lower row includes a cell surrounded by a heavy line. The cell is an input enable cell. The operator inputs numeric values to cells for the radius of curvature R1 of the shoulder 18 and the inclination angle θ of the flat portion 20 by referring to the standard numeric data on the upper row (STEP 6). The calculating portion 4 decides whether the input numeric values can be achieved in an actual tire or not (STEP 7). If the same numeric values cannot be achieved, a recorrection is promoted. If the numeric values can be achieved, the calculating portion 4 calculates the length L of the flat portion 20 and the radius of curvature R2 of the upper sidewall 22 based on the numeric values thus input (STEP 8). In order to have the geometrical relationship shown in FIG. 3 in the calculation, a program is created. A numeric value thus calculated is displayed on the lower row of the table in FIG. 8. At the same time, a recalculation is also carried out for the other dimensions and values thus obtained are displayed on the lower row of the table in FIG. 8 (STEP 9). Simultaneously with the calculation (STEP 8), the new coordinates of the end Pa of the tread 16 are determined.

If the displayed numeric values are not satisfied, the operator inputs the numeric values again (STEP 6). By carrying out the input again, the recalculation is performed. If the displayed numeric values are satisfied, the operator clicks a button of "Save option". By the click, the profile 12 is determined (STEP 10). By the determination, the input numeric data and the calculated numeric data are stored in the storage portion 6. By the data, the shape of the profile 12 can be specified. Based on the data, the profile 12 of the tire is drawn by CAD software (STEP 11). It is also possible to use FEM software in place of the CAD software.

Depending on the numeric values input to the picture of FIG. 8, the shoulder 18 might be provided in contact with circular arcs other than the circular arc A9. For example, the shoulder 18 might be provided in contact with the circular arc A10, the circular arc A8, the circular arc A7 and the like. In this case, the coordinates of the point Pa are determined in consideration of an equivalent relationship to the geometrical relationship shown in FIG. 3 in relation to the circular arc.

Figure 9:
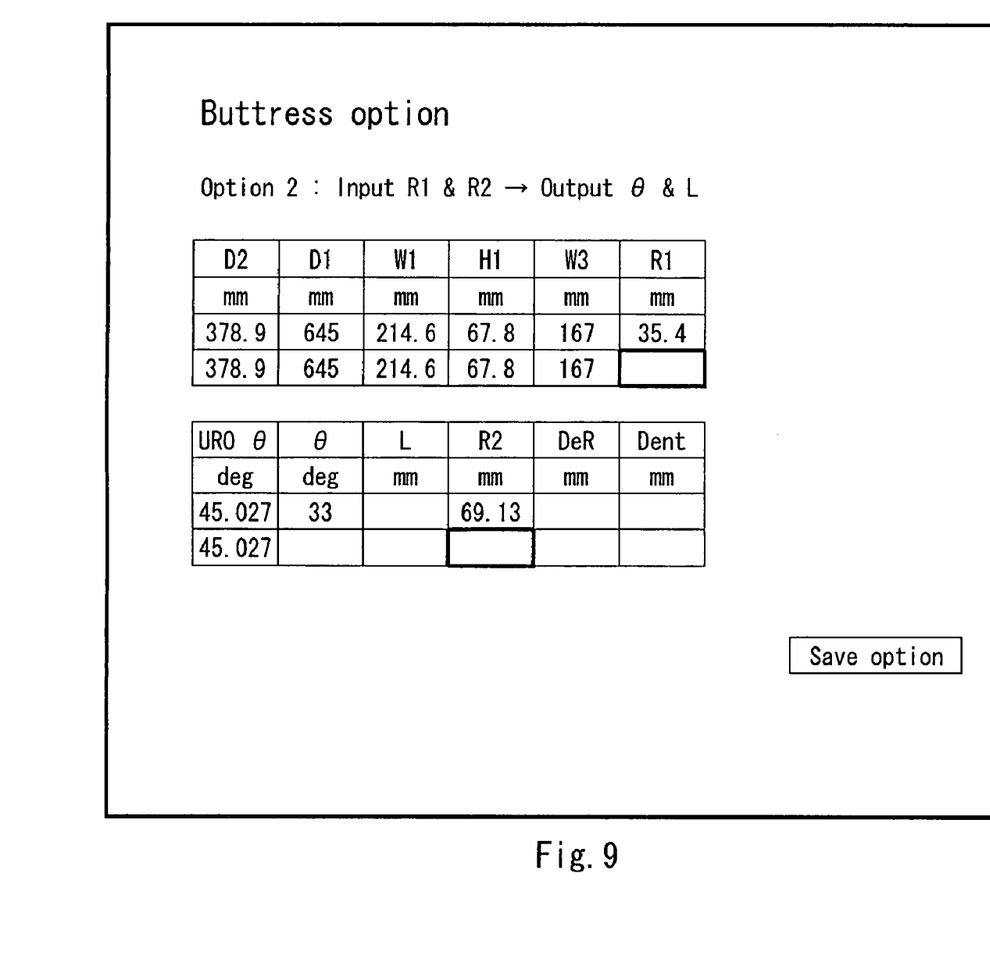
FIG. 9 is a front view showing a picture displayed on the system in FIG. 1.

If "Option 2" is selected in the picture shown in FIG. 7, a picture shown in FIG. 9 is displayed on the display portion 8. In the picture, the radius of curvature R1 of the shoulder 18 and the radius of curvature R2 of the upper sidewall 22 are input. By the calculating portion 4, it is decided whether the input numeric values can be achieved in an actual tire or not. If the same numeric values can be achieved, the calculating portion 4 calculates the inclination angle θ and the length L in the flat portion 20 based on the input numeric values. In order to have the geometrical relationship shown in FIG. 3 in the calculation, a program is created. By clicking a button of "Save option", the input numeric data and the calculated numeric data are stored in the storage portion 6. By the data, the shape of the profile 12 can be specified. Based on the data, the profile 12 of the tire is drawn by the CAD software.

Figure 10:
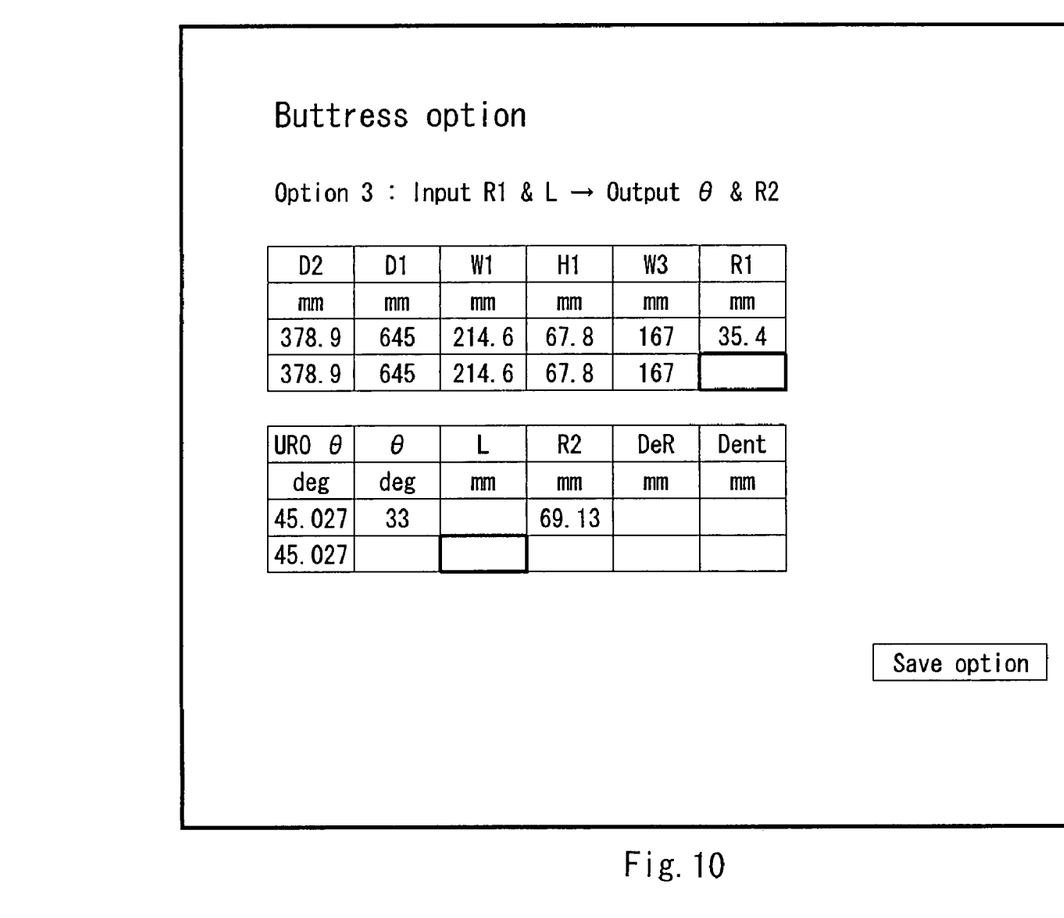
FIG. 10 is a front view showing a picture displayed on the system in FIG. 1.

If "Option 3" is selected in the picture shown in FIG. 7, a picture shown in FIG. 10 is displayed on the display portion 8. In the picture, the radius of curvature R1 of the shoulder 18 and the length L of the flat portion 20 are input. By the calculating portion 4, it is decided whether the input numeric values can be achieved in an actual tire or not. If the same numeric values can be achieved, the calculating portion 4 calculates the inclination angle θ of the flat portion 20 and the radius of curvature R2 of the upper sidewall 22 based on the input numeric values. In order to have the geometrical relationship shown in FIG. 3 in the calculation, a program is created. By clicking a button of "Save option", the input numeric data and the calculated numeric data are stored in the storage portion 6. By the data, the shape of the profile 12 can be specified. Based on the data, the profile 12 of the tire is drawn by the CAD software.

Figure 11:
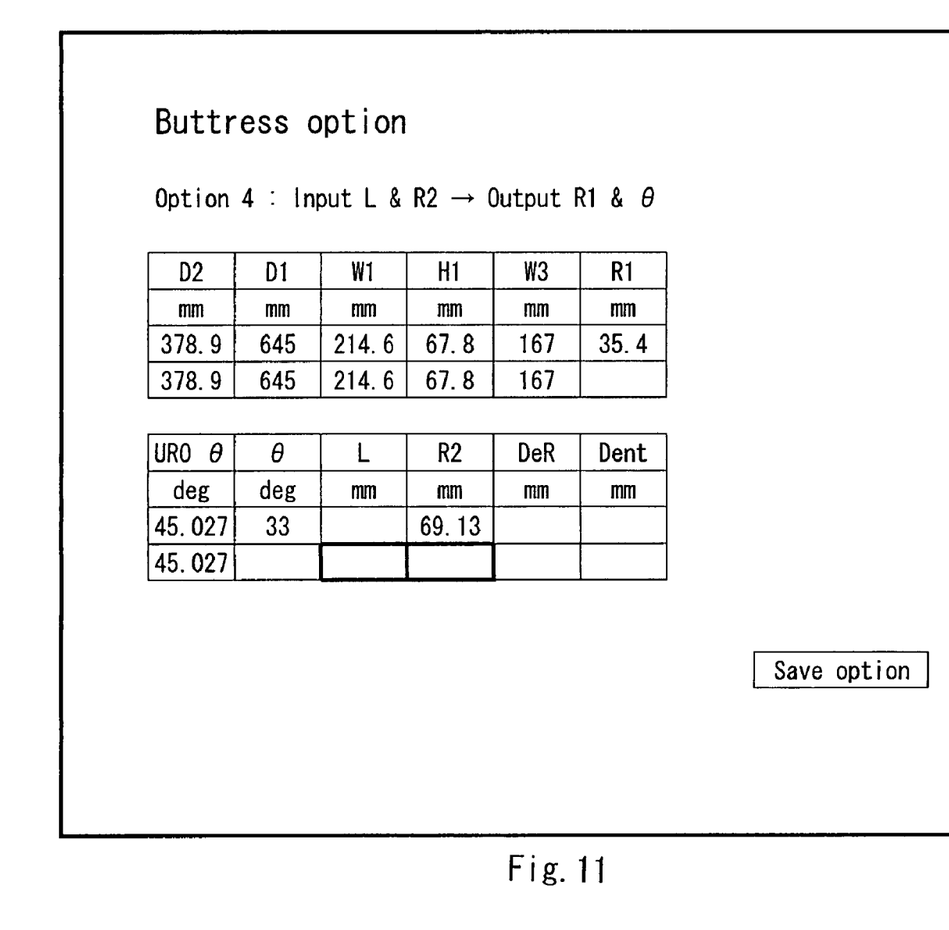
FIG. 11 is a front view showing a picture displayed on the system in FIG. 1.

If "Option 4" is selected in the picture shown in FIG. 7, a picture shown in FIG. 11 is displayed on the display portion 8. In the picture, the length L of the flat portion 20 and the radius of curvature R2 of the upper sidewall 22 are input. By the calculating portion 4, it is decided whether the input numeric values can be achieved in an actual tire or not. If the same numeric values can be achieved, the calculating portion 4 calculates the radius of curvature R1 of the shoulder 18 and the inclination angle θ of the flat portion 20 based on the input numeric values. In order to have the geometrical relationship shown in FIG. 3 in the calculation, a program is created. By clicking a button of "Save option", the input numeric data and the calculated numeric data are stored in the storage portion 6. By the data, the shape of the profile 12 can be specified. Based on the data, the profile 12 of the tire is drawn by the CAD software.

As described above, in the designing method according to the present invention, it is possible to easily design a profile in the vicinity of a buttress. By using the designing method, it is possible to considerably shorten a time taken for designing a tire profile. The numeric data obtained by the designing method are general purpose data, for example, spreadsheet program data. The data can be utilized in various types of CAD software and FEM software.

By the designing method according to the present invention, it is also possible to design a tire profile having no adjustment portion. By the designing method according to the present invention, it is also possible to design a tire profile in which a dent is formed in the adjustment portion. By the designing method according to the present invention, it is also possible to design a tire profile in which a shoulder is provided in contact with a virtual tread other than the multiradius tread.

The above description is only illustrative and various changes can be made without departing from the scope of the present invention.

What is claimed is:

1. A method of designing a tire profile including a tread, a shoulder, a sidewall, and an adjustment portion between the shoulder and the sidewall, and wherein the adjustment portion is flat, the method comprising the steps of:

inputting numeric values of a radius of curvature of the shoulder and an inclination angle of the adjustment portion; and using a computer to calculate numeric values of a length of the adjustment portion and a radius of curvature of an upper sidewall based on the input numeric values in order to provide the adjustment portion being in contact with the shoulder at an upper end and being in contact with the sidewall at a lower end.

2. The designing method according to claim 1, further comprising the step of drawing a tire profile by CAD software or FEM software based on the input numeric values and the calculated numeric values.

3. A method of designing a tire profile including a tread, a shoulder, a sidewall, and an adjustment portion between the shoulder and the sidewall, and wherein the adjustment portion is flat, the method comprising the steps of:

inputting numeric values of a radius of curvature of the shoulder and a radius of curvature of an upper sidewall; and using a computer to calculate numeric values of an inclination angle of the adjustment portion and a length of the adjustment portion based on the input numeric values in order to provide the adjustment portion being in contact with the shoulder at an upper end and being in contact with the sidewall at a lower end.

4. The designing method according to claim 3, further comprising the step of drawing a tire profile by CAD software or FEM software based on the input numeric values and the calculated numeric values.

5. A method of designing a tire profile including a tread, a shoulder, a sidewall, and an adjustment portion between the shoulder and the sidewall, and wherein the adjustment portion is flat, the method comprising the steps of:

inputting numeric values of a radius of curvature of the shoulder and a length of the adjustment portion; and using a computer to calculate numeric values of an inclination angle of the adjustment portion and a radius of curvature of an upper sidewall based on the input numeric values in order to provide the adjustment portion being in contact with the shoulder at an upper end and being in contact with the sidewall at a lower end.

6. The designing method according to claim 5, further comprising the step of drawing a tire profile by CAD software or FEM software based on the input numeric values and the calculated numeric values.

7. A method of designing a tire profile including a tread, a shoulder, a sidewall, and an adjustment portion between the shoulder and the sidewall, and wherein the adjustment portion is flat, the method comprising the steps of:

inputting numeric values of a length of the adjustment portion and a radius of curvature of an upper sidewall; and using a computer to calculate numeric values of a radius of curvature of the shoulder and an inclination angle of the adjustment portion based on the input numeric values in order to provide the adjustment portion being in contact with the shoulder at an upper end and being in contact with the sidewall at a lower end.

8. The designing method according to claim 7, further comprising the step of drawing a tire profile by CAD software or FEM software based on the input numeric values and the calculated numeric values.

* * * * *